United States Patent
Yilma et al.

(10) Patent No.: US 10,434,854 B2
(45) Date of Patent: Oct. 8, 2019

(54) TONNEAU COVER WITH QUICK RELEASE TABLE

(71) Applicant: Ford Global Technologies, LLC, Dearborn, MI (US)

(72) Inventors: Benjamin Yilma, Canton, MI (US); Pattrick Loew, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 15/710,876

(22) Filed: Sep. 21, 2017

(65) Prior Publication Data

US 2019/0084391 A1      Mar. 21, 2019

(51) Int. Cl.
| | |
|---|---|
| *B60J 7/14* | (2006.01) |
| *B25H 1/04* | (2006.01) |
| *B60P 7/02* | (2006.01) |
| *F16M 11/04* | (2006.01) |
| *A47B 3/08* | (2006.01) |

(52) U.S. Cl.
CPC ................ *B60J 7/141* (2013.01); *B25H 1/04* (2013.01); *B60P 7/02* (2013.01); *A47B 3/08* (2013.01); *F16M 11/041* (2013.01)

(58) Field of Classification Search
CPC ... B60J 7/141; B25H 1/04; B60P 7/02; F16M 11/041
See application file for complete search history.

(56) References Cited

U.S. PATENT DOCUMENTS

| | | | |
|---|---|---|---|
| 4,824,163 A | 4/1989 | Hendrych | |
| 6,527,326 B2 | 3/2003 | Henderson | |
| 6,533,344 B1 | 3/2003 | Patterson | |
| 8,424,946 B2 | 4/2013 | Newberg et al. | |
| 10,017,099 B2 * | 7/2018 | Yilma | B60P 7/08 |
| 2009/0314187 A1 | 12/2009 | Miller | |

* cited by examiner

*Primary Examiner* — D Glenn Dayoan
*Assistant Examiner* — Melissa A Black
(74) *Attorney, Agent, or Firm* — Carlson, Gaskey & Olds, P.C.

(57) ABSTRACT

A disclosed cover system for a vehicle cargo area includes at least one panel including folding legs, a hinge, and at least one clasp securing the panel to the hinge. In a clasped position the panel is secured to the hinge and in a released position the panel is removable from the hinge.

19 Claims, 3 Drawing Sheets

TONNEAU COVER WITH QUICK RELEASE TABLE

TECHNICAL FIELD

This disclosure relates to a table configured as part of a tonneau cover for a pickup truck cargo area.

BACKGROUND

Vehicles such as pickup trucks have a cargo area that may include a tonneau cover for covering and securing cargo. The tonneau cover may have different separable sections that enable folding and storage. A pickup truck is a vehicle that is often utilized for work or other commercial uses. Space in the cargo area is limited and therefore features that aid in organizing and storing items are useful. Moreover, features that reduce the number of items that are actually required to be placed in the cargo area are also of great use.

SUMMARY

A cover system for a vehicle cargo area according to an exemplary aspect of the present disclosure includes, among other things, at least one panel including folding legs, a hinge, and at least one clasp securing the panel to the hinge. In a clasped position the panel is secured to the hinge and in a released position the panel is removable from the hinge.

In a further non-limiting embodiment of the foregoing cover system, the hinge has a channel and the at least one clasp secures the panel within the channel.

In a further non-limiting embodiment of any of the foregoing cover systems, the channel includes a width across the cover that is attached at each end to a middle portion.

In a further non-limiting embodiment of any of the foregoing cover systems, the channel includes a C-shaped cross-section extending across the width.

In a further non-limiting embodiment of any of the foregoing cover systems, a length of the middle portion is at least as wide as twice a thickness of the panel.

In a further non-limiting embodiment of any of the foregoing cover systems, the at least one clasp includes at least two clasps spaced apart along the width of the panel.

In a further non-limiting embodiment of any of the foregoing cover systems, the at least one clasp includes a fixed part mounted on one of the panel and the channel and a locking arm on the other of the panel and the channel.

In a further non-limiting embodiment of any of the foregoing cover systems, the at least one panel includes three panels and only one of the three panels include the folding legs.

In a further non-limiting embodiment of any of the foregoing cover systems, the panel includes a rigid plastic panel.

A cover system for a vehicle cargo area according to another exemplary aspect of the present disclosure includes, among other things, a plurality of panels pivotally attached to each other and including an end panel having folding legs. A hinge having a middle portion supporting a pivoting channel receiving a side of the end panel. At least one clasp securing the end panel to the pivoting channel, in a clasped condition the end panel is secured within the pivoting channel and in a released position the end panel is removable from the pivoting channel.

In a further non-limiting embodiment of any of the foregoing cover systems, the channel includes a width and has a C-shaped cross-section across the width.

In a further non-limiting embodiment of any of the foregoing cover systems, a length of the middle portion is at least twice as wide as a thickness of one of the plurality of panels.

In a further non-limiting embodiment of any of the foregoing cover systems, each of the plurality of panels comprise a rigid plastic panel.

In a further non-limiting embodiment of any of the foregoing cover systems, the at least one clasp includes at least two clasps spaced apart along the width of the channel.

In a further non-limiting embodiment of any of the foregoing cover systems, each of the at least two clasps has a fixed part on one of the end panel and the channel and a locking arm on the other of the end panel and the channel.

The various features and advantages of this disclosure will become apparent to those skilled in the art from the following detailed description. The drawings that accompany the detailed description can be briefly described as follows.

DETAILED DESCRIPTION

This disclosure details an exemplary cover system including a quick release hinge for a separable portion that can be utilized as a table. These and other features are discussed in greater detail in the following paragraphs of this detailed description.

Although a specific component relationship is illustrated in the figures of this disclosure, the illustrations are not intended to limit this disclosure. In other words, the placement and orientation of the various components of the vehicle are shown schematically and could vary within the scope of this disclosure. In addition, the various figures accompanying this disclosure are not necessarily to scale, and some features may be exaggerated or minimized to show certain details of a particular component.

Figure 1:
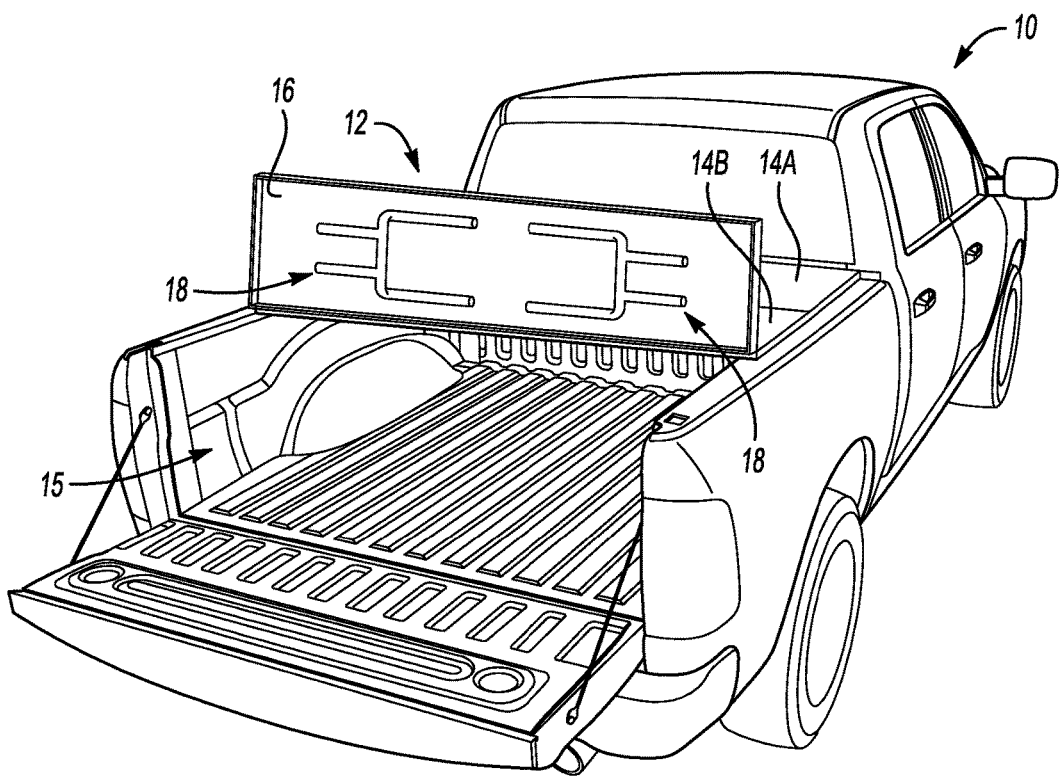
FIG. 1 is a schematic view of a pickup truck including a cover system with a removable table.
Figure 2:
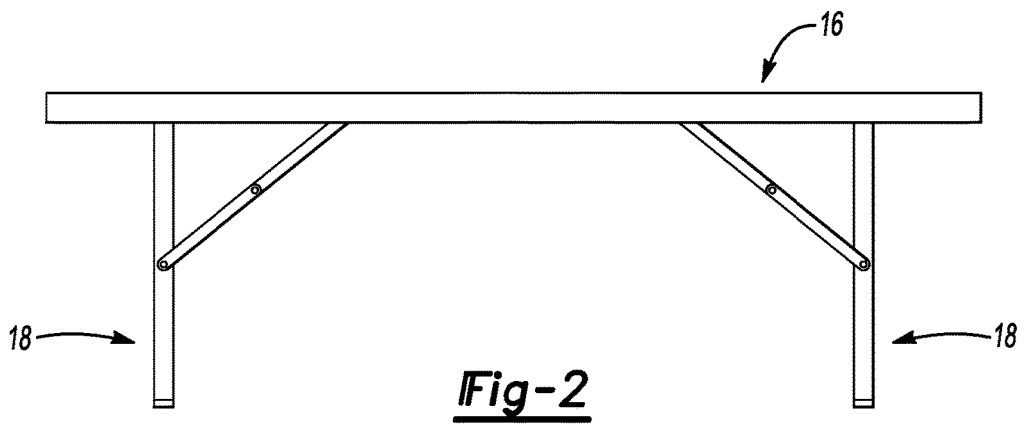
FIG. 2 is a side view of a portion of the cover utilized as a table.

Referring to FIGS. 1 and 2, a vehicle 10 includes a cover system 12 that covers a cargo area 15. The cover system 12 includes panels 14A, 14B and an end panel 16. The end panel 16 is removable from the other panels 14A-B and includes foldable legs 18 such that it may be utilized as a table as show in FIG. 2. The end panel 16 is easily removable from the panels 14 of the cover system 12 without the use of tools or other devices.

Figure 3:
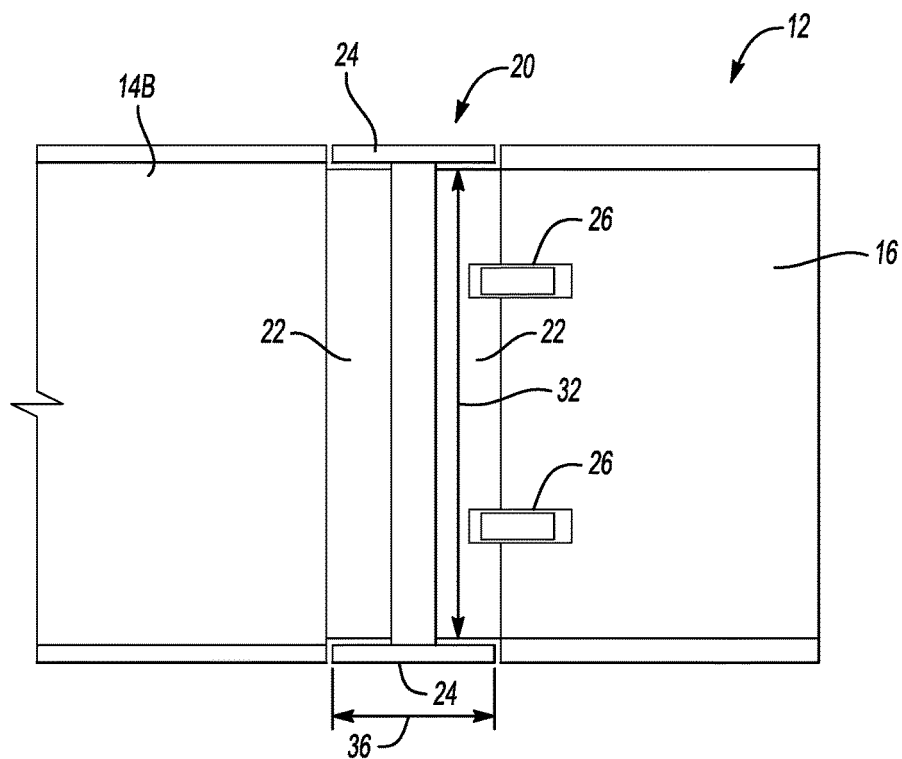
FIG. 3 is a top view of a portion of the example cover system.

Referring to FIG. 3 with continued reference to FIGS. 1 and 2, the example cover system 12 includes the end panel 16 that is attached by way of a hinge 20 to panel 14B. The hinge 20 includes a pivoting channel 22 that is pivotal relative to a middle portion 24. The end panel 16 is held within the pivoting channel 22 by clasps 26 that are spaced apart along a width 32 of the end panel 16 and channel 22.

Figure 4:
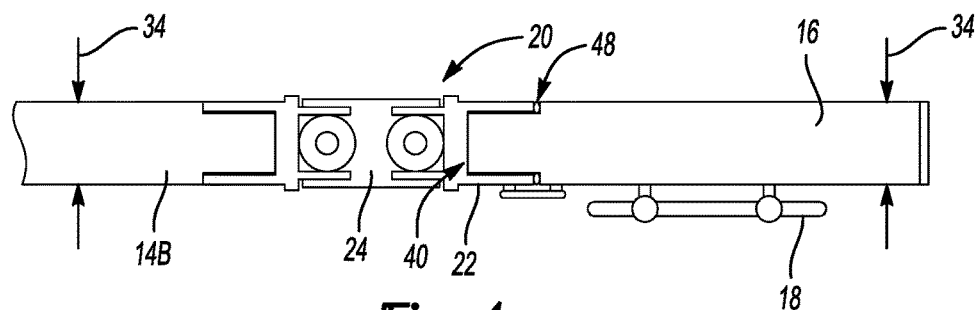
FIG. 4 is a cross-sectional view of an end panel of the example cover system.

Referring to FIG. 4 with continued reference to FIG. 3, the middle portion 24 includes a length 36 that is at least twice a thickness 34 of each of the panels 14B and 16. The middle portion 24 that is pivotally attached to pivoting channels 22. The pivoting channels 22 have a substantially c-shaped cross-section that receives a side 40 of the end panel 16. The side 40 of the end panel 16 is secured within the c-shaped channel by the clasps 26. A seal 48 is provided between the c-shaped channel and the end panel 16 to provide a water tight seal along the full length of the c-shaped channel.

In the disclosed example, the clasps 26 include a fixed part 28 that is disposed on the pivoting channel 22 and an arm part 30 that is fixed to the end panel 16. Once the side 40 of the end panel 16 is inserted into the pivoting channel 22, the clasp 26 is secured to hold the end panel 16 within the hinge 20.

Figure 5:
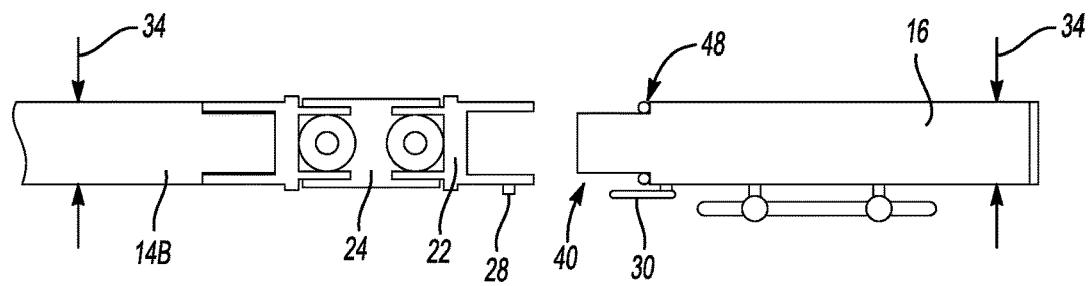
FIG. 5 is a cross-sectional view of the end panels of the cover system released from an example hinge assembly.

Referring to FIG. 5 with continued reference to FIGS. 3 and 4, the end panel 16 is shown removed from the hinge 20 and c-shaped channel 22. In this Figure, the clasp 26 is released such that the arm 30 is no longer engaged in the fixed part 28. In this example disclosed embodiment, the fixed portion 28 of the clasp 26 is disposed on the pivoting channel 22 and the arm portion 30 is on the removable end panel 16. However, the parts may be reversed such that the fixed portion 28 is on the end panel 16 and the arm 30 placed on the pivoting channel 22. Moreover, although FIG. 3 illustrates two clasps 26 spaced apart along with width 32 of each end panel, additional clasps and/or clasps of a different configuration could be utilized to secure the end panel 16 into the hinge 20.

The clasps 26 are disposed on a bottom surface of the end panel 16 such that when the cover system is closed, the clasps 26 along with the table folding legs 18 are hidden from view.

Figure 6A:
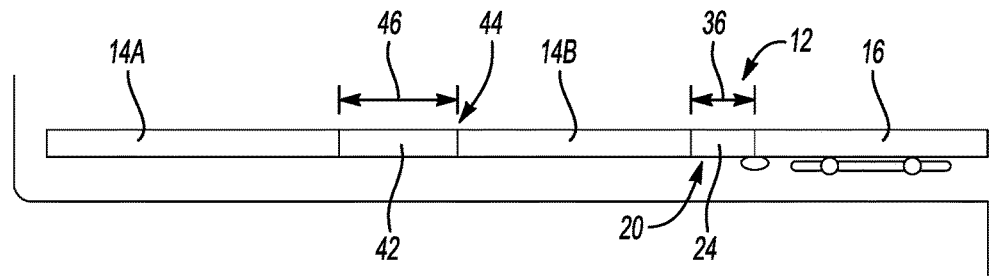
FIG. 6A is a schematic view of the example cover system in an extended position.
Figure 6B:
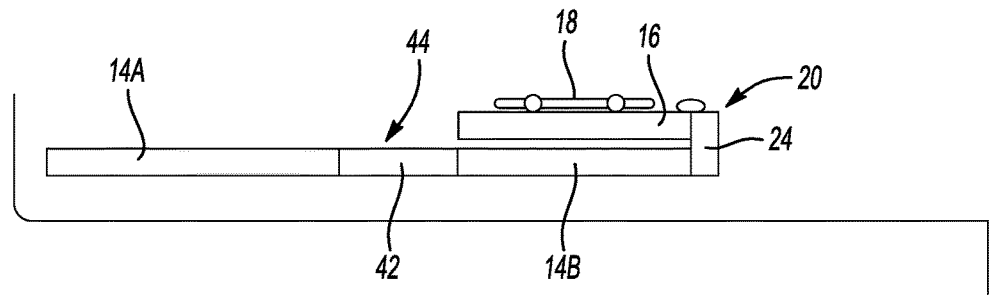
FIG. 6B is an example view of the cover system in a partially folded position.
Figure 6C:
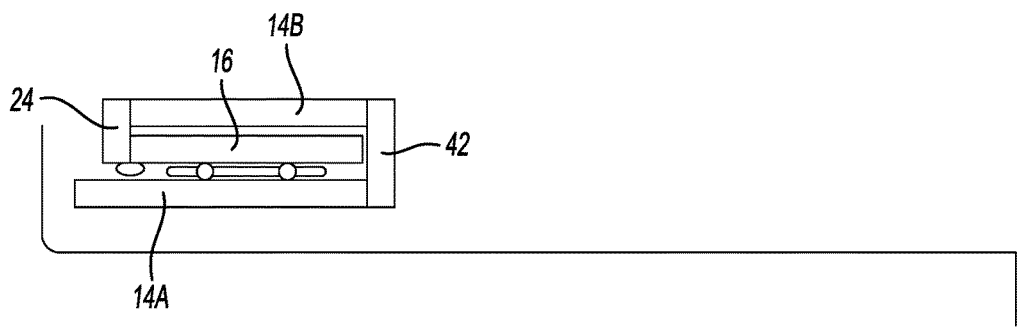
FIG. 6C is a schematic view of the example cover system in a folded position.

Referring to FIGS. 6A, 6B and 6C, the example cover system 12 is shown in an initially extended position illustrated in FIG. 6A where the panels 14A, 14B and the end panel 16 cover the entire cargo area 15 of the vehicle 10. The panels 14A-B are attached to one another by way of a hinge 44 and the end panel 16 is attached to the panel 14B by the hinge 20. The hinge 20 includes a middle portion 24. The middle portion 24 includes the length 36 that is at least as wide as twice a thickness 34 of the end panel 16. The length 36 of the middle portion 24 is provided to enable the end panel 16 to be folded on top of the panel 14B as is illustrated in FIG. 6B.

A hinge 44 between panels 14A and 14B has a middle portion 42 a length 46 that is larger than the width 36 of the middle portion 24. This increased width enables the panel 14B and end panel 16 to be folded yet again atop the panel 14A as is illustrated in FIG. 6C. The additional length provided by the middle portion 42 enables the combined width of the panel 14B and end panel 16 to be folded atop the panel 14A.

Accordingly, the clasps 26 and c-shaped pivoting channel 22 enable the quick release and securement of the end panel 16 such that it may be easily removed and reinstalled to the cover system 12 for use on a job site, work site or for other uses where a table may be desired without requiring additional space in the cargo area 15.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cover system for a vehicle cargo area comprising:
   at least one panel including folding legs;
   a hinge; and
   at least one clasp movable relative to the hinge between a clasped position and a released position, the at least one clasp securing the panel to the hinge, wherein in the clasped position the panel is secured to the hinge and in the released position the panel is removable from the hinge.

2. The cover system as recited in claim 1, wherein the hinge has a channel and the at least one clasp secures the panel within the channel.

3. The cover system as recited in claim 2, wherein the channel includes a width across the cover that is attached at each end to a middle portion.

4. The cover system as recited in claim 3, wherein the channel has a c-shaped cross-section extending across the width.

5. The cover system as recited in claim 3, wherein a length of the middle portion is at least as wide as twice a thickness of the panel.

6. The cover system as recited in claim 3, wherein the at least one clasp comprises at least two clasps disposed on a top surface of the panel and spaced apart along the width of the panel.

7. The cover system as recited in claim 3, wherein the at least one clasp includes a fixed part mounted on one of the panel and the channel and a locking arm on the other of the panel and the channel.

8. The cover system as recited in claim 1, wherein the at least one panel includes a plurality of panels and only one of the plurality of panels include the folding legs.

9. The cover system as recited in claim 1, wherein the panel comprises a rigid plastic panel.

10. A cover system for a vehicle cargo area comprising:
    a plurality of panels pivotally attached to each other and including an end panel having folding legs;
    a hinge having a middle portion supporting a pivoting channel receiving a side of the end panel; and
    at least one clasp movable relative to the hinge between a clasped position and a released position, the at least one clasp securing the end panel to the pivoting channel, wherein in the clasped position the end panel is secured within the pivoting channel and in a released position the end panel is removable from the pivoting channel.

11. The cover system as recited in claim 10, wherein the pivoting channel includes a C-shaped cross-section across a width of the hinge.

12. The cover system as recited in claim 11, wherein a length of the middle portion is at least twice as wide as a thickness of one of the plurality of panels such that the end panel maybe folded atop one of the plurality of panels.

13. The cover system as recited in claim 10, wherein each of the plurality of panels comprise a rigid plastic panel.

14. The cover system as recited in claim 11, wherein the at least one clasp comprises at least two clasps spaced apart along the width of the channel.

15. The cover system as recited in claim 14, wherein each of the at least two clasps has a fixed part on one of the end panel and the channel and a locking arm on the other of the end panel and the channel.

16. The cover system as recited in claim 1, wherein the hinge comprises two pivoting channels disposed on opposite sides of a middle portion, wherein each of the pivoting channels are separately rotatable relative to the middle portion.

17. The cover system as recited in claim 16, wherein the two pivoting channels are rotatable to move the end panel to a folded position where the end panel is resting atop another panel attached to one of the two pivoting channels.

18. The cover system as recited in claim 10, wherein the hinge comprises two pivoting channels disposed on opposite sides of the middle portion, wherein each of the pivoting channels are separately rotatable relative to the middle portion.

19. The cover system as recited in claim 18, wherein one of the plurality of panels and the end panel are secured within a corresponding one of the pivoting channels and the middle portion is movable relative to the hinge portions into a position transverse to each of the middle panel and the end panel.

* * * * *